US009152411B2

(12) United States Patent
Livshits et al.

(10) Patent No.: US 9,152,411 B2
(45) Date of Patent: Oct. 6, 2015

(54) EDGE COMPUTING PLATFORM FOR DELIVERY OF RICH INTERNET APPLICATIONS

(75) Inventors: Benjamin S. Livshits, Kirkland, WA (US); Emre Mehmet Kiciman, Seattle, WA (US); David Simmons, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 529 days.

(21) Appl. No.: 12/778,784

(22) Filed: May 12, 2010

(65) Prior Publication Data
US 2011/0283355 A1 Nov. 17, 2011

(51) Int. Cl.
G06F 9/44 (2006.01)
G06F 17/30 (2006.01)

(52) U.S. Cl.
CPC .............. *G06F 8/70* (2013.01); *G06F 17/3089* (2013.01); *G06F 17/30899* (2013.01)

(58) Field of Classification Search
CPC ....................... G06F 17/3089; G06F 17/30899
USPC .......................................................... 717/177
See application file for complete search history.

(56) References Cited

U.S. PATENT DOCUMENTS

| 6,668,325 B1* | 12/2003 | Collberg et al. ............ 713/194 |
| 7,051,315 B2* | 5/2006 | Artzi et al. .................. 717/103 |
| 7,275,243 B2 | 9/2007 | Gibbons et al. |
| 7,395,534 B2* | 7/2008 | Alcazar et al. .............. 717/174 |
| 2002/0028671 A1 | 3/2002 | I'Anson et al. |
| 2003/0181193 A1 | 9/2003 | Wilhelmsson et al. |
| 2003/0182626 A1 | 9/2003 | Davidov et al. |
| 2004/0220998 A1 | 11/2004 | Shenfield et al. |
| 2006/0143601 A1* | 6/2006 | Concha et al. ............... 717/170 |

(Continued)

FOREIGN PATENT DOCUMENTS

WO 2009139437 A1 11/2009

OTHER PUBLICATIONS

Kiciman, "AjaxScope: A Platform for Remotely Monitoring the Client-Side Behavior of Web 2.0 Applications", ACM Symposium on Operating Systems Principles, Proceedings of the Twenty-First ACM SIGOPS Symposium on Operating Systems Principles, Oct. 14-17, 2007, pp. 17-30, ACM, New York, NY, USA.

(Continued)

*Primary Examiner* — Dede Zecher
*Assistant Examiner* — Jason C Chiang
(74) *Attorney, Agent, or Firm* — Nicholas Chen; Kate Drakos; Micky Minhas (57) ABSTRACT

An edge computing platform that provides on-demand delivery of Rich Internet Applications and other applications is disclosed. One embodiment includes an optional manager node and content distribution network (CDN) that include one or more compute nodes. The CDN collects information pertaining to execution of a software application. The CDN aggregates the information and transfers the aggregated information to the manager node. The manager node analyzes the information from the CDN and transfers results of the analysis to the CDN. The CDN receives a software application that is designed to be dynamically updated when executed at the clients. The CDN modifies the software application based on the information from the manager node. The CDN receives a request that pertains to the software application from a client device. The CDN transfers at least a portion of the modified software application to the client.

14 Claims, 9 Drawing Sheets

(56) References Cited

U.S. PATENT DOCUMENTS

| | | | |
|---|---|---|---|
| 2008/0016504 A1 | 1/2008 | Cheng et al. | |
| 2008/0092058 A1* | 4/2008 | Afergan et al. | 715/745 |
| 2008/0104025 A1* | 5/2008 | Dharamshi et al. | 707/3 |
| 2008/0178298 A1* | 7/2008 | Arai et al. | 726/29 |
| 2008/0201452 A1* | 8/2008 | Athas et al. | 709/219 |
| 2008/0222621 A1 | 9/2008 | Knight et al. | |
| 2009/0049097 A1* | 2/2009 | Nocifera et al. | 707/104.1 |
| 2009/0063491 A1* | 3/2009 | Barclay et al. | 707/9 |
| 2009/0083714 A1 | 3/2009 | Kiciman et al. | |
| 2009/0215440 A1 | 8/2009 | Dolset | |
| 2009/0265760 A1* | 10/2009 | Zhu et al. | 726/3 |
| 2009/0292791 A1 | 11/2009 | Livshits et al. | |
| 2010/0056127 A1* | 3/2010 | Osborne et al. | 455/418 |
| 2010/0162231 A1* | 6/2010 | Lanchares et al. | 717/177 |
| 2010/0191692 A1* | 7/2010 | Gassewitz et al. | 706/47 |
| 2010/0228819 A1* | 9/2010 | Wei | 709/203 |
| 2010/0306366 A1* | 12/2010 | Cragun et al. | 709/224 |
| 2011/0055371 A1* | 3/2011 | Serban | 709/224 |
| 2011/0058675 A1* | 3/2011 | Brueck et al. | 380/277 |
| 2011/0138064 A1* | 6/2011 | Rieger et al. | 709/228 |

OTHER PUBLICATIONS

Korteum, "On-Demand Delivery of Software in Mobile Environments", Nomadic Computing Workshop, 11th International Parallel Processing Symposium, Apr. 1-5, 1997, Geneva, Switzerland.

Microsoft Web Sandbox', Microsoft Live Labs, website, retrieved Jan. 7, 2010, http://websandbox.livelabs.com/.

Livshits, "Doloto: Code Splitting for Network-Bound Web 2.0 Applications", Foundations of Software Engineering, Proceedings of the 16th ACM SIGSOFT International Symposium on Foundations of software engineering, Nov. 9-14, 2008, pp. 350-360, ACM, New York, NY, USA.

Mager, "Marissa Mayer Flexes Google's Imagination Muscle", web blog, May 29, 2008, 5 pages, http://www.andrewmager.com/marissa-mayer-flexes-her-imagination-muscle/.

Samuel first named project owner, "Google-Caja", Project Hosting on Google Code, retrieved Jan. 7, 2010, http://code.google.com/p/google-caja/.

"Smartphones 2007: The ARPU Generation Machine", Research Information website, In-Stat, retrieved Jan. 7, 2010, http://www.instat.com/abstract.asp?id=66&SKU=IN0703823WH.

Terdiman, "Google Launches AdSense for Games", website, CNET News, Oct. 7, 2008, http://news.cnet.com/8301-13772_3-10060732-52.html.

Popa, "Using Code Collection to Support Large Applications on Mobile Devices", International Conference on Mobile Computing and Networking, Proceedings of the 10th annual international conference on Mobile computing and networking, Sep. 26,-Oct. 1, 2004, pp. 16-29, ACM, New York, NY, USA.

English translation of Abstract of Foreign Document Publication No. WO2009139437, published Nov. 19, 2009.

\* cited by examiner

EDGE COMPUTING PLATFORM FOR DELIVERY OF RICH INTERNET APPLICATIONS

BACKGROUND

Rich Internet Applications (RIAs) are software applications that have many of the characteristics of desktop applications. An example of an RIA is an interactive mapping program that allows a user to pan and zoom on a map, obtain driving directions, etc. Numerous problems exist when delivering RIAs and other software applications to client devices. Some problems are especially challenging when delivering the application to a mobile client such as a cellular telephone. However, problems exists delivering software applications to any type of client device.

Performance is one problem in delivering such applications to clients. Rich Internet Applications oftentimes require hundreds of kilobytes or megabytes of JavaScript or other code to be downloaded to the client's Web browser before the application can start. As RIAs grow in size and complexity they are increasingly coming up against barriers of network bandwidth and latency. Note that for some clients, the cost of downloading large amount of content can be quite expensive.

Security is another problem when delivering such applications to clients. For example, the code that is provided to the client might have originated from more than one source. If one of the sources is not trusted, then security problems exist in delivering the code to the client. Other security challenges exist.

Meeting e-commerce needs is another problem when delivering such applications to clients. For example, a web site that hosts the application that is to be transferred to the client may generate revenue by placement of advertisements. Naturally, the advertisers wish to target their advertisements to the correct target audience. However, providing the correct advertisements when delivering such applications to clients can be challenging. Other e-commerce challenges exist.

Thus, a need exists for delivering RIAs and other software applications to client devices.

SUMMARY

The present disclosure, roughly described, relates to methods of transferring software applications to client devices. Techniques provide higher performance, meet security goals, and meet e-commerce goals. One embodiment includes an edge computing platform that provides on-demand delivery of software applications to client devices. In one embodiment, a web application is provided to a client device, such as a mobile phone, running a web browser.

One embodiment includes a method of distributing content to clients. The method comprises a content distribution network collecting information from one or more client devices. The information is analyzed to develop a profile of a software application's behavior and usage at the one or more client devices. The software application is modified based on the profile. A request that pertains to the software application is received at the content distribution network from a client device. At least a portion of the modified software application is transferred from the content distribution network to the client. Transferring the modified application includes transferring portions of the application to allow the client to dynamically update the application during execution at the client.

One embodiment includes a content distribution system that includes a manager node and a plurality of content distribution networks in communication with the manager node. Each content distribution network includes one or more compute nodes. The content distribution networks collect information from one or more client devices. The content distribution networks aggregate the information and transfer the aggregated information to the manager node. The manager node analyzes the information from the content distribution networks to develop a profile of the software application's behavior and usage at the one or more client devices. The manager node sends the profile to the content distribution networks. The content distribution networks receive a software application that is designed to be dynamically updated during execution. A first of the content distribution networks modifies the software application based on the profile from the manager node. A first content distribution network receives a request that pertains to the software application from a client device. The first content distribution node transfers at least a portion of the modified software application to the client device.

One embodiment includes a method of distributing content that includes the following. A software application is received at content distribution networks. Each content distribution network includes one or more compute nodes. The software application is designed to be dynamically updated during execution. Information from one or more client devices is collected at the content distribution networks. The information is analyzed to develop a profile of the software application's behavior and usage at the one or more client devices. The software application is modified based on the profile. A first request is received at a compute node in one of the content distribution networks from a client device. The first request is a request to access a web page associated with the application. At least a portion of the modified software application is transferred from the compute node to the client in response to the first request. A second request is received at the compute node from the client device. The second request is for a specific piece of code within the application. The specific piece of code is a part of a file within the application. The specific piece of code is transferred from the compute node to the client in response to the second request without transferring the file.

DETAILED DESCRIPTION

The present disclosure, roughly described, relates to methods of transferring software applications to client devices. The software applications may be applications that are designed to be dynamically updated when executed at the client devices. Techniques provide high performance, meet security goals, and meet e-commerce goals. One embodiment includes an edge computing platform that provides on-demand delivery of RIAs and other software applications. In addition, the edge computing platform may provide computation services and functionalities, such as secure mash-up services and advertising services.

Figure 1:
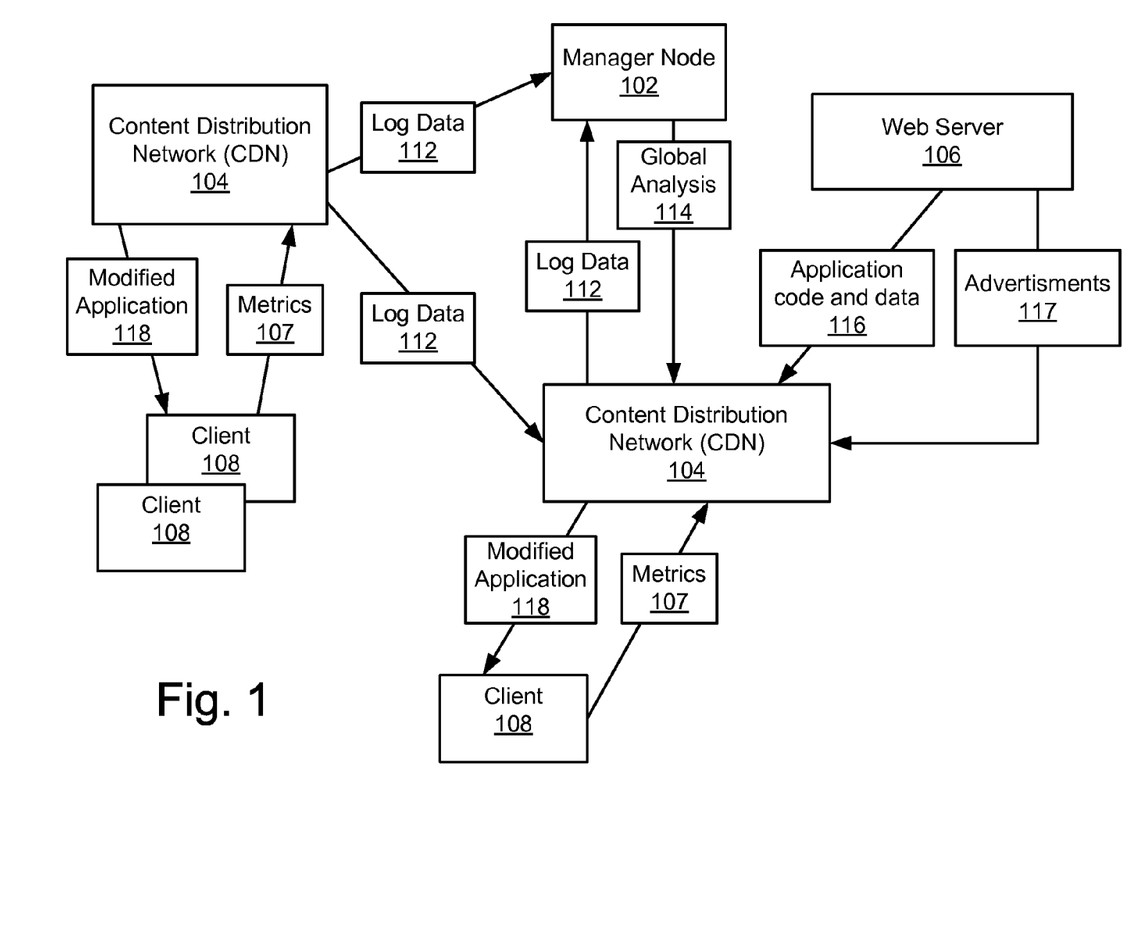
FIG. 1 depicts an example system for delivering application code and data to clients.

FIG. 1 depicts an example system for delivering application code and data to clients. The system includes Content Distribution Networks (CDNs) 104, clients 108, a web server 106, and a manager node 102.

A given client 108 may be mobile device, such as a cellular telephone. However, the client 108 may be any electronic device such as a laptop computer, notepad computer, personal digital assistant (PDA), desktop computer, etc. The client device 108 may have software that runs a web browser that allows the client 108 to view web pages. For the sake of illustration, a person might use the client 108 to visit a website to view a map or obtain driving directions.

In some embodiments, the server 106 is a data center or server farm. In one embodiment, the server 106 hosts a web page that is associated with a software application 116. Herein, the term "software application" 116 will be used to refer to a combination of application code and/or application data 116. For the sake of illustration, the software application 116 could be an interactive mapping application that allows visitors to a website to zoom in and out of a map, drag the map to view another location, obtain driving directions, etc. The application 116 might also include a spreadsheet application and/or data (e.g., numbers) in the spreadsheet application. As still another example, the application 116 might also include a text editor and/or data (e.g., text) in the document editor. The server 106 may also provide advertisements 117, which the CDN 104 may integrate into the application 116.

Each CDN 104 may include one or more compute nodes, such as servers. The CDNs 104 may be strategically located at different geographic locations in order to deliver content to the clients 108 efficiently. For example, rather than each client 108 contacting the server 106 directly, each client 108 might contact a compute node in a CDN 104. Therefore, there is no bottleneck at the server 106. Also, the CDN 104 may be located close to the clients 108 that it serves to cut down on data transfer time. Techniques are known for routing a client request to an appropriate CDN 104. For example, a Domain Name Server (DNS) may route the client's request to a CDN 104 that is closest to the client 108. A CDN 104 may provide "edge computing," due the location of the CDN 104 near the client 108.

The manager node 102 coordinates the activities of the CDNs 104. The manager node 102 may include one or more compute nodes. The manager node 102 communicates with the CDNs 104 in order to receive log data 112 from the CDNs 104 and send global analysis 114 of the log data 112 to the CDNs 104. For example, the manager node 102 may analyze the log data 112 from the CDNs 104 to determine global analysis 114 for providing the application 116 to the clients 108. The manager node 102 may send these global analysis 114 to the different CDNs 104.

Figure 2:
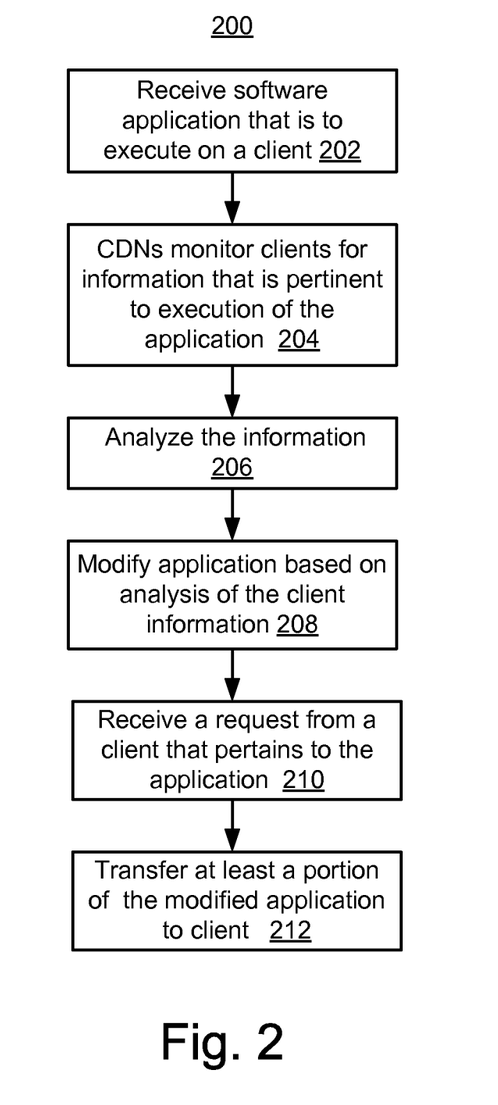
FIG. 2 is a flowchart of one embodiment of a process of providing an application to a client.

FIG. 2 is a flowchart of one embodiment of a process 200 of providing on-demand delivery of an application 116 to a client 108. The process 200 may be performed by an edge-computing platform. Note that the edge-computing platform does not merely deliver the application 116, but may provide many other benefits including, but not limited to, performance, security, and e-commerce goals. Reference will be made to the example system of FIG. 1 when discussing process 200; however, process 200 is not so limited. The steps in process 200 are described in a certain order as a matter of convenience. However, it will be appreciated that the steps could be performed in a different order.

In step 202, a software application 116 is received at the CDNs 104. In one embodiment, the CDN 104 obtains the application 116 from the server 106, which may reside in a data center or server farm. Note that the application 116 could be delivered in whole or in part. Further, different parts of the application 116 could be delivered at different times. Also, note that the CDN 104 may obtain the application 116 at any time. For example, the CDN 104 might pre-fetch application data in anticipation of a client request.

The software application 116 may be one that is designed to be dynamically updated when executed at the client. For example, only part of the code or data is sent to the client initially. During execution, other code and/or data may be sent to update execution at the client. As one particular example, only part of the code and data of a mapping application is initially sent to the client. During execution, the client may request additional portions of the application in order to dynamically update the execution.

In step 204, the CDNs 204 monitor clients 108 for information that is pertinent to the execution of the application 116. For example, In one embodiment, each CDN 104 generates it own log data 112. Numerous ways to monitor are described herein; however, the monitoring is not limited to the techniques described herein. In one embodiment, compute nodes in the CDN 204 monitor network traffic. In one embodiment, compute nodes in the CDN 204 instrument the application 116 in order to collect metrics regarding execution of the application 116 on the client 108. As a result of the instrumentation, the client 108 may send metrics 107 to the CDN 104. Examples of the metrics 107 include, but are not limited to, function hit times, average running times, memory utilization, and garbage collection (GC) frequency. In one embodiment, a compute node in the CDN 204 queries the client 108 for device capabilities such as screen resolution, processor speed, etc.

In step 206, the information is analyzed in order to develop a profile of the application's usage and behavior at the client devices. In one embodiment, the CDN 104 performs local analysis. The CDN 104 may analyze the information locally to change the way that it provides the application 116 to its clients 108. For example, the CDN 104 may determine that clients 108 tend to request application code in a certain sequence. Therefore, the CDN 104 could pre-fetch application code in anticipation of a request. In one embodiment, the CDN 104 sends the collected information to the manager node 102 to perform global analysis. Thus, the CDN 104 may sends log data 112 to the manager node 102, which may collect log data from other CDNs 104. After performing global analysis, the manager node 102 may send global analysis 114 to the CDNs 104. Further details of performing the analysis are described below. Further details of analyzing the information is discussed with respect to FIG. 4.

In step 208, the application 116 is modified based on the analysis. For example, the application 116 is modified based on profile that is determined in step 206. In one embodiment, the modification is to break the application 116 into smaller pieces based on what portions of the application 116 are needed by the client 108 initially and what can be transferred later. For example, the CDN 104 may determine that the client 108 only needs certain sections of the application code and certain application data initially. In one embodiment, the modification is to tailor the application 116 to capabilities of the client 108. For example, the type of compression that is used can be based on the de-compression capabilities of the client 108.

Note that the modification does not need to be related to performance benefits. In one embodiment, the modification is to insert advertisements into the application 116. In one embodiment, the modification is to instrument the application 116 such that metrics 107 may be collected. In one embodiment, the modification is to use a particular compression algorithm based on the capabilities of the client 108. The foregoing are listed for the sake of illustration. It will be understood that the application 116 may be modified in many other ways.

In step 210, a request that pertains to the application 116 is received from one of the clients 108. For example, a user might enter a request into a web browser on the client 108. The request may be sent to one of the compute nodes in one of the CDNs 104. As a specific example, a user of a mobile phone running a web browser might click on a link to access a mapping application. However, note that the client request is not required to be the direct result of a user request. For example, software running on the client 108 might send a request for an additional portion of the application while the user is viewing the mapping application, but not in response to any specific user action. As a specific example, the client 108 might send a request for a specific piece of code within the application 116 without any corresponding user request. Further details of requesting a specific piece of code are described with respect to FIG. 5.

In step 212, at least a portion of the modified application 116 is transferred to the client 108. The CDN 104 sends at least portions of the application to the client over a communication connection between the client and a compute node in the CDN. For example, the application 116 may include a number of functions and some data. The CDN may send one or more of the functions and some of the data to the client in response to a client request. The client may request additional portions of the application 116 while running the application 116. In one embodiment, the client 108 sends a request for a specific piece of code. Note that this allows for fine grained control over the amount of information that is transferred to the client 108. For example, the client 108 does not need to request that an entire file is transferred to it if the client 108 only needs one or a few functions, modules, or other pieces of code from the file. In one embodiment, the CDN pre-fetches additional portions of the application 116 (e.g., code and/or data). For example, the CDN 104 anticipates that the client's needs and pre-fetches application code and/or data, which it may push to the client 108 prior to a client request. Step 212 may include transferring portions of the modified application to allow the client to dynamically update the application during execution.

Figure 3:
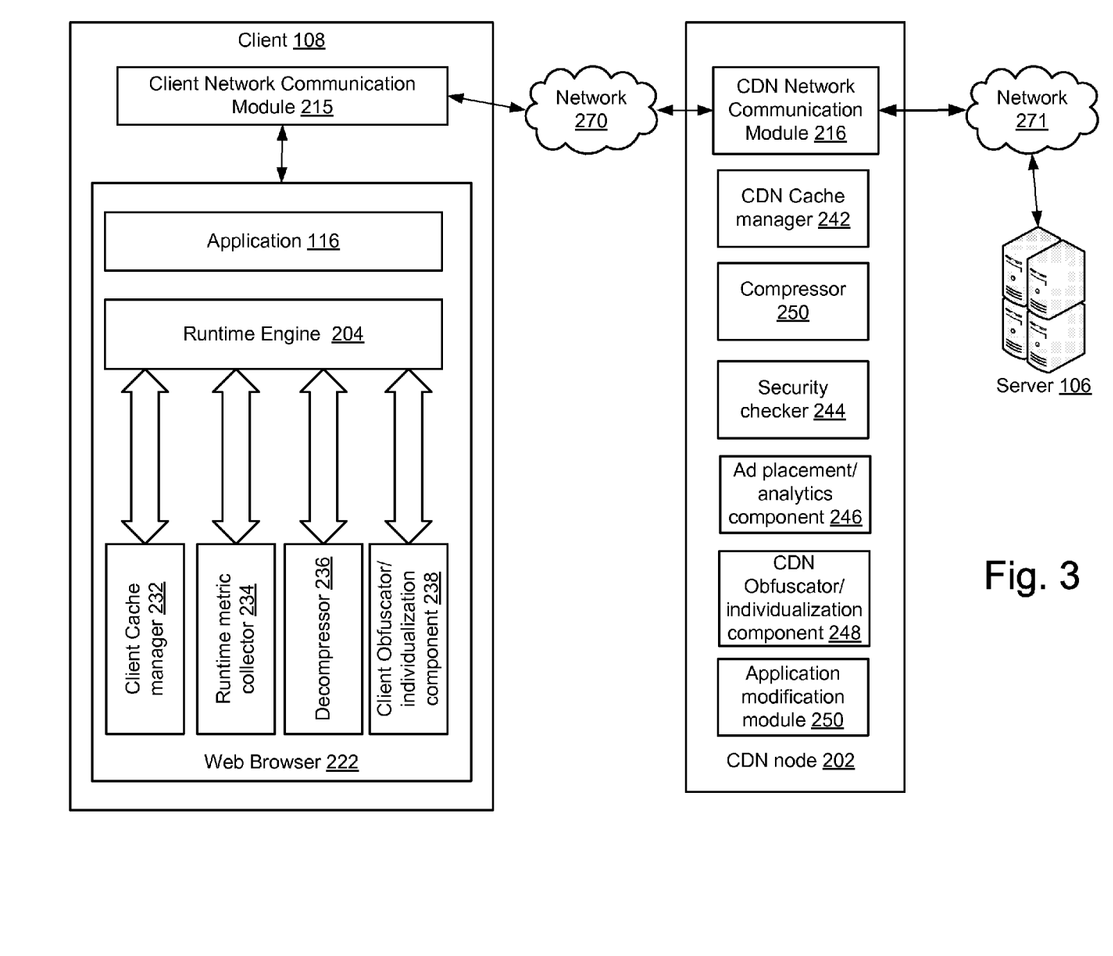
FIG. 3 is a diagram of one embodiment of a client device and a compute node of a CDN.

FIG. 3 is a diagram of one embodiment of a client device 108 and a compute node 202 of a CDN 104, showing various software components on the client device 108 and the compute node 202 of the CDN 104. The various software components represent some of the functionality that the CDNs 104 are able to perform. The client device 108 includes a client network communication module 215, a web browser 222, an application 116, a runtime engine 204, a client cache manager 232, a runtime metric collector 234, a decompressor 236, and a client obfuscation/individualization component 238. The compute node 202 may be one node in the CDN 104. For example, the compute node 104 may be a server that the client 108 is able to connect to using, for example, an HTTP request. The compute node 202 has a CDN network communication module 216, CDN cache manager 242, security checker 244, advertisement placement/analytics component 246, compressor 250, CDN obfuscation/individualization component 248, and application modification module 250.

The client 108 has a client network communication module 215 for communicating with the CDN network communication module 216 in the CDN node 202 over the network 270. In one embodiment, the network 270 includes the Internet. Note that the network 270 may be made up of multiple networks. The CDN node 202 communicates with the server 106 over network 271. In one embodiment, the network 271 includes the Internet. Note that the network 271 may be made up of multiple networks.

In one embodiment, the runtime engine 204 on the client 108 is a browser runtime engine. For example, the runtime engine 204 may be a JavaScript runtime engine. The application 116 that runs on the client 108 is the application 116 (or part thereof) that has been provided by the compute node 202. The compute node 202, in turn, obtained the application 116 from the server 106. As previously mentioned, the server 106 may reside in a data center or server farm. In one embodiment, the application 116 is run by the runtime engine 204.

The runtime engine 204 communicates with the client cache manager 232, the runtime metric collector 234, the decompressor 236, and the client obfuscation/individualization component 238. In some embodiments, in order to run the application 116, the runtime engine 204 requests application code from the client cache manager 232. For example, the runtime engine 204 may request a piece of code associated with the application 116. The client cache manager 232 is able to interact with the compute node 202 to obtain the application code. For example, the client cache manager 232 may request a piece of code from the CDN cache manager 242.

The runtime metrics collector 234 receives metrics 107 regarding execution of the application 116 on the client 108. For example, the runtime engine 204 may be instrumented with performance counters that collect information about execution of the application 116. Examples of metrics 107 includes, but are not limited to, average running times, memory utilization, garbage collection frequency. In one embodiment, the application 116 is instrumented with performance counters such that runtime metrics may be collected. The runtime metrics collector 234 passes the metrics 107 on to the compute node 202. The compute node 202 aggregates the metrics 107. The compute node 202 may remove any personally identifiable information to comply with local regulations about data collection and storage. In one embodiment, the kind and amount of instrumentation is adapted based on environmental conditions.

The decompressor 236 on the client 108 decompresses information that is compressed by the compressor 250 on the compute node 202. The compute node 202 might use a special compression tactic (such as shared dictionary compression) to send information (e.g., software code and data) to the client 108. For example, the compute node 202 might send images instead of HTML and code. The decompressor 236 on the client 108 is able to decode the information and, if needed, pass it to the runtime engine 204. In one embodiment, the compute node 202 receives compressed information from the server 106 and decompresses it prior to sending it to the client 108. As an example, the compute node 202 may perform such decompression if the compression is of a special type that the client 108 is unable to decompress.

The obfuscation and individualization component (OIC) 248 on the compute node 202 obfuscates application code 116 from the web server 106 before it is sent to the client 108. This makes it difficult for the client 108 to reverse engineer the code. The code obfuscation may be individualized per connected client device 108 to make ever even harder to reverse engineer.

The security checker 244 on the compute node 202 enforces security. For instance, the final code of a page can be subjected to static (or dynamic) analysis to prevent possible security and reliability bugs.

The advertisement placement/analytics component 246 on the compute node 202 can insert advertisements into applications before sending them to the client 108. To do so, the compute node 202 may collect information about the application context, user cookies, and other similar context clues.

The application modification module 250 modifies the application 116 prior to transferring to the client 108. Further details are discussed with respect to FIG. 6.

Figure 4:
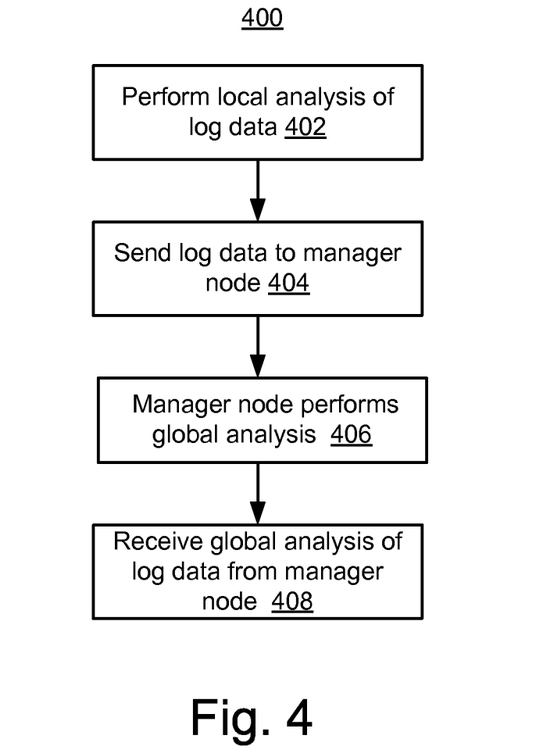
FIG. 4 is a flowchart of one embodiment of a process of analyzing information that is collected by CDNs.

FIG. 4 is a flowchart of one embodiment of a process 400 of analyzing information that is collected by CDNs 104. The results of the analysis may be used to modify the application 116 prior to sending it to the client 108. Process 400 is one embodiment of step 206 of process 200. Recall that a CDN 104 can collect information in numerous ways, including, but not limited to, monitoring network traffic between the clients 108 and CDN 104, and instrumenting the application 116 to collect metrics 107. The runtime engine 204 may also be instrumented in order to provide metrics 107.

In step 402, a compute node 202 in a CDN 104 performs local analysis of information. This analysis may be performed on a CDN-by-CDN basis. For example, each CDN 104 may perform its own local analysis of information collected by that CDN 104.

In step 404, the CDNs 104 send either the results of the local analysis or the log data 112 to the manager node 102. The log data 112 may include metrics 107, as well as other information such as data from monitoring network traffic.

In step 406, the manager node 102 performs a global analysis of the log data 112 from the CDNs 104. For example, the manager node 102 may determine that regardless of geographic location execution of the application on the clients 108 has certain tendencies. Examples of tendencies could include, but are not limited to, amount of time executing certain functions, sequences in which code or data is requested, etc. The manager node 102 might also determine which tendencies are specific to a given geographic location. The result of the manager node's 102 analysis will be referred to as global analysis 114. The global analysis 114 is one way of developing a profile of an application's usage and behavior at the clients.

In step 408, the manager node 102 transfers the global analysis 114 to CDNs 104. Note that in some cases, a CDN 104 that did not collect any information may be provided with global analysis 114. For example, a recently established CDN 104 may be provided the global analysis 114. Therefore, the recently established CDN 104 is able to modify the application 118 based on information collected by other CDNs 104.

In one embodiment, CDNs 104 exchange log data 112. Therefore, in addition, or as an alternative, to sending the log data 112 to the manager node 102, a CDN 104 may send the log data to another CDN 104. Therefore, the global analysis may be performed by a CDN 104.

Figure 5:
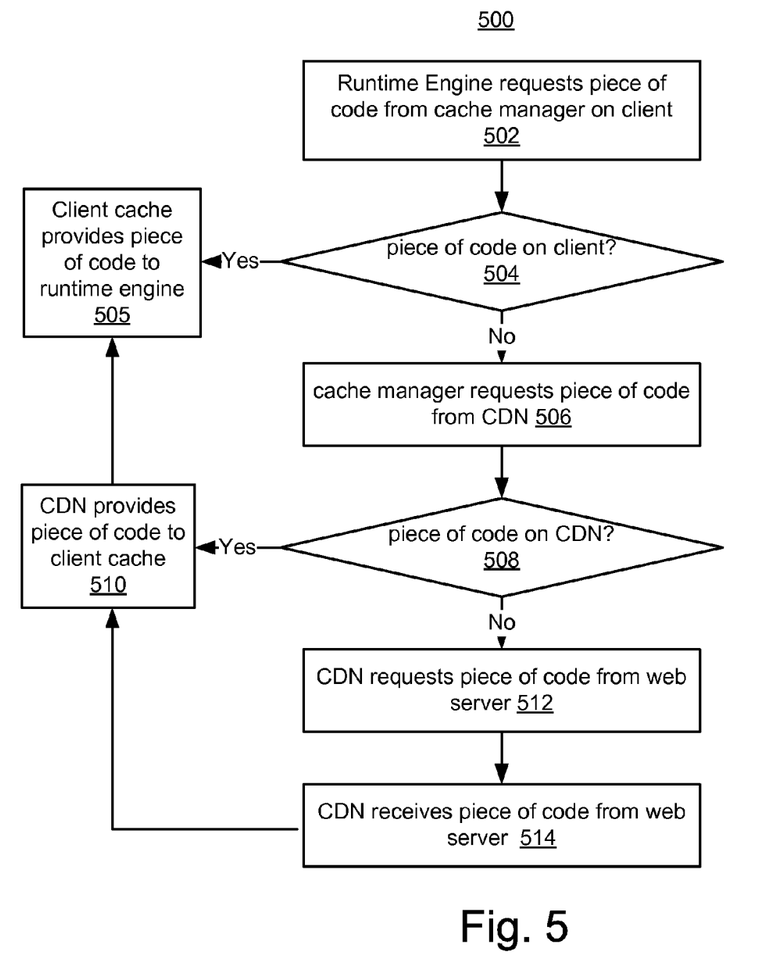
FIG. 5 is a flowchart of one embodiment of a process of a client making a request that pertains to the application and receiving a response thereto.

FIG. 5 is a flowchart of one embodiment of a process 500 of a client requesting a piece of code within the application 116 and receiving a response thereto. Examples of the piece of code include, but are not limited to, functions, modules, classes, and namespaces. Process 500 allows fine-grained control over delivery of the application 116 to the client 108 because the client 108 is able to request a specific piece of code that is associated with the application. Process 500 is one embodiment of a receiving a client request that pertains to the application 116 and responding thereto of steps 210-212 of process 200. Process 500 is typically performed after a portion of the application 116 has been transferred to the client 108. For example, a portion of a mapping application may be transferred to the client 108 in response to a user request. While running the application 116, the runtime engine 204 may determine that it needs (or will need in the future) a specific piece of code within the application 116. In step 502, the runtime engine 204 on the client 108 requests a that is associated with the application 116 from the client cache manager 232.

In step 504, the client cache manager 232 determines whether the piece of code has already been cached on the client 108 in step 504. If so, the client cache manager 232 provides the piece of code to the runtime engine 204 in step 505. If the piece of code is not cached, then the client cache manager 232 requests the piece of code from the CDN cache manager 242, in step 506.

In step 508, the CDN cache manager 242 determines whether the CDN 104 has a copy of the piece of code. Note that the piece of code might reside on the CDN compute node 202 or another compute node 202 in the CDN 104. If a copy exists in the CDN 104, then the CDN cache manager 242 provides the piece of code to the client cache manager 232 in step 510.

If the piece of code is not on the CDN 104, then the CDN cache manager 242 requests the piece of code from the server 106 in step 512. In step 514, the CDN cache manager 242 receives the piece of code from the server 106. Then, the CDN cache manager 242 provides the piece of code to the client cache manager 232 in step 510. Then, the client cache manager 232 provides the piece of code to the runtime engine 204 in step 505.

Figure 6:
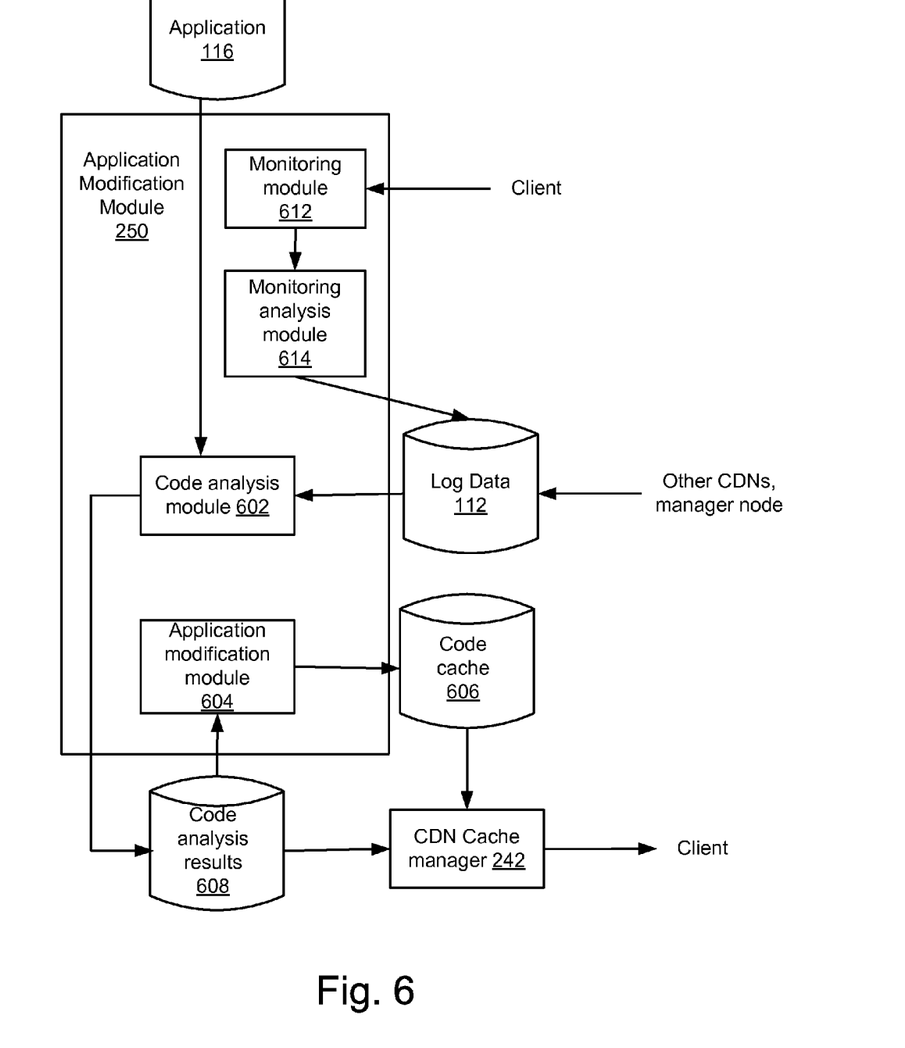
FIG. 6 is a diagram of one embodiment of an application modification module of a CDN compute node.

FIG. 6 is a diagram of one embodiment of an application modification module 250 of a CDN compute node 202, along with various inputs and outputs. FIG. 6 depicts additional details of one embodiment of the application modification module 250 of the compute node 202 of FIG. 3. The application modification module 250 outputs the modified application to the code cache 606 such that it is available for delivery to the client 108. There are many different types of modifications that can be made to the application 116. Some modifications can be done for performance reasons. As an example, the code might be split up such that only certain portions (e.g., certain piece of codes) are delivered to the client 108 to minimize the amount of code that needs to be transferred. However, note that the modifications are not limited to performance reasons. The modifications might be done to benefit e-commerce goals. For example, advertisements could be inserted into the application. The modifications might be done to meet security goals.

Figure 7:
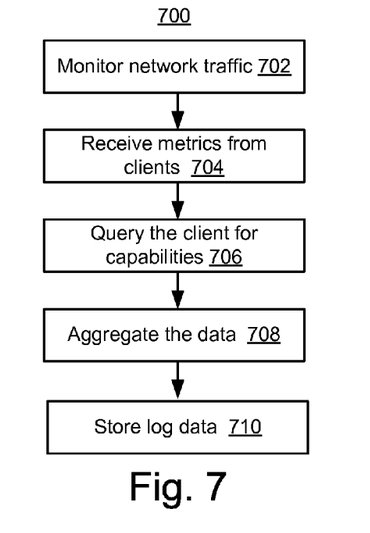
FIG. 7 is a flowchart of one embodiment of a process of a CDN generating log data.
Figure 8A:
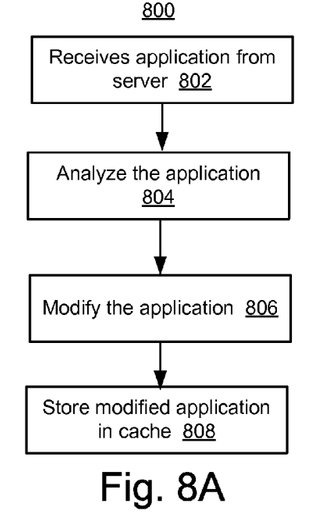
FIG. 8A is a flowchart of one embodiment of a process of a CDN modifying an application.
Figure 8B:
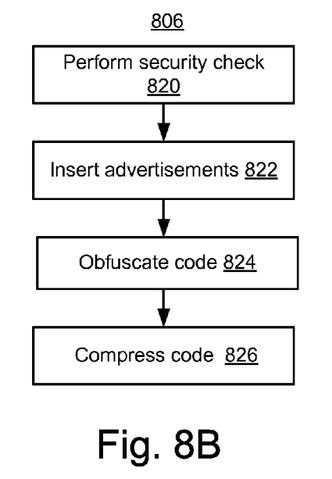
FIG. 8B depicts one embodiment of a process of modifying the application.

The application modification module 250 includes a monitoring module 612, a monitoring analysis module 614, a code analysis module 602, and a code re-writing module 604. In general, the application modification module 250 inputs the application 116 and log data 112. The application modification module 250 may also receive input from other modules on the compute node 202, such as the advertisement placement component 246. The application modification module 250 outputs log data 112, modified application to the code cache 606, and code analysis results 608. FIG. 7 depicts a process 700 of generating log data 112. FIGS. 8A and 8B depicts processes of generating a modified application. FIGS. 7, 8A and 8B will be used to explain operation of the example application modification module 250 of FIG. 6.

FIG. 7 is a flowchart of one embodiment of a process 700 of a CDN 104 generating log data 112. Process 700 is one embodiment of step 204 of process 200. Process 700 will be discussed with reference to the example system of FIG. 6. It will be understood that steps of process 700 are described in a certain order as a matter of convenience. In step 702, the compute node 202 monitors network traffic between the compute node 202 and clients 108. Monitoring network traffic may include monitoring what requests are made by clients 108. For example, a sequence of requests that involve the application 116 may be monitored/recorded.

In step 704, the compute node 202 receives metrics 107 from the client 108. In one embodiment, the runtime engine 204 is instrumented such that metrics 107 regarding execution of the application 116 on the client may be collected and reported to the CDN node 202 by the runtime metrics collector 234 on the client. In one embodiment, the runtime engine 204 on the client 108 is instrumented by setting flags. For example, in the Java runtime engine, certain flags may be set to log various information. One such flag is "verbose:gc," which logs garbage collector runs to determine how long they are taking. Another flag that may be set is "Xprof," which turns on a low-impact sampling profiler. Still another flag that may be set is "Xrunhprof," which turns on a higher-impact instrumenting profiler. Many other flags could be set in a Java runtime engine 204.

In step 706, the compute node 202 queries the client 108 as to its capabilities. For example, the client 108 is queried as to its screen resolution, processor speed, etc. As another example, the client 108 is queried as to its ability to perform decompression.

In step 708, the compute node 202 aggregates and analyzes the data collected in steps 702-704. For example, the monitoring module 612 passes the collected metrics 107, device capabilities, and other information to the monitoring analysis module 614. Note that some of the information might be relevant to clients 108 in general. For example, the sequence in which clients 108 typically make requests might be used to pre-fetch application data. However, some of the information might be primarily relevant to one client 108. For example, the type of decompression that a client 108 can perform might be primarily relevant to one client 108. However, even data such as client capabilities can be aggregated and analyzed to determine whether there may be a pattern.

In step 708, the compute node 202 stores the aggregated/analyzed data in the log data 112. As previously discussed, the compute node 202 may send its log data 112 to the manager node 102 or other CDNs 104. Likewise, the manger node 202 may send global analysis 114 to the CDN 104. The global analysis 114 may be stored in the log data 112. Referring to FIG. 6, the log data 112 may be input to the application modification module 250.

FIG. 8A is a flowchart of one embodiment of a process 800 of a CDN 104 modifying an application 116. Process 800 is one embodiment of step 208 of process 200. Process 800 will be discussed with reference to the example system of FIG. 6. It will be understood that steps of process 800 are described in a certain order as a matter of convenience. In step 802, the compute node 202 receives the application 116 from the server. The compute node 202 may receive the entire application 116 or only portion of the application 116.

In step 804, the code analysis module 602 analyzes the application 116. Results of the analysis are stored in the code analysis results 608. The results 608 may include information such as what functions (or other units of code) of the application 116 tend to be accessed by the client, order of accessing the functions, execution times, etc. In some embodiments, the code analysis module 602 analyzes the application 116 based on the log data 112. As mentioned, the log data 112 may be derived from information collected locally by the CDN 104 or from global analysis sent by the manager node 102. In some embodiments, the code analysis module 602 performs a static analysis of the application 116 that does not necessarily depend on the log data.

In step 806, the application modification module 604 modifies the application. The modified application 116 is stored in the code cache 606. In one embodiment, the application modification module 604 inputs the code analysis results. Therefore, the application 116 might be modified based on information such as what functions (or other piece of code) are accessed by the client 108, order of accessing the functions, execution times. FIG. 8B provides further details of one embodiment of modifying an application 116.

In step 808, the modified application is stored in the code cache 606. In some embodiments, there is one code cache 606 for all compute nodes 202 in a CDN 104. In some cases, the modified application 116 could be transferred to the client 108 prior to or without ever storing in the code cache 606.

FIG. 8B depicts one embodiment of a process 806 of modifying the application 116. The process 806 is one embodiment of step 806 of process 800. Note that the steps are performed in a certain order as a matter of convenience. Also, it will be understood that not all of the steps are always performed. Other steps not explicitly stated may also be performed. In step 820, a security check is performed. In one embodiment, the security checker 244 checks for problems during a mash operation. A mash operation involves combining data and/or code from different servers. There is the potential problem, that the code from one server is untrusted. For example, a malicious entity could present a security risk or interfere with operation of the others code. The CDN 104 acts as a security enforcer. For example, after the CDN 104 does the mash operation to combine the code and/or data from different source, the CDN 104 performs some tests. Only if the tests pass will the mashed up code be sent to the client 108. Other security checks may be performed.

In step 822, advertisements are inserted into the applications 116. For example, the application modification module 604 either receives input from, or otherwise works with, the advertisement placement component 246 to insert advertisements into the modified application. The decision of what advertisements to insert may be made based on the locally collected information and/or the global information.

In step 824, the obfuscation/individualization component 248 obfuscates and/or individualizes the application 116. In one embodiment, the obfuscation/individualization component 248 obfuscates the application 116 prior to sending it to the client 108 to make it difficult for the client 108 to reverse engineer the code. In one embodiment, the individualizes the application 116, which means that each client 108 may be served a different version of the application 116. Individualizes the application 116 per connected client device 108 can make it even harder to reverse engineer the code. Other techniques such as inserting noise into the application 116 may also be used.

In step 826, the compressor 250 compresses the application 116. In one embodiment, the type of compression is based on the decompression capabilities of the client 108. In one embodiment, the decompressor 236 on the client 108 is adapted to work with a special compression scheme used by the CDN 104. However, the CDN 104 is able to select a compression scheme based on the client's capabilities. For example, the CDN 104 may receive compressed information from the server 106, decompress it, and then compress it with a suitable compression technique for the client 108.

The foregoing examples of modifying the application 116 are for purposes of illustration. The CDN compute node 202 is able to modify the application 116 in many other ways. Further details of one technique for modifying an application are described in Published U.S. Patent Application 2009/0292791, filed on May 23, 2008, entitled, "Automated Code Splitting and Pre-fetching for Improving Responsiveness of Browser-based Applications." Said Application is hereby incorporated by reference in its entirety for all purposes.

In various embodiments, the electronic devices execute computer readable instructions that are stored on computer readable media. For example, process 200, 400, 500, 700, 800, and/or 806 may be implemented by executing, on a processor, instructions that are stored on a computer readable storage medium. Computer readable media can be any available media that can be accessed by the electronic devices. By way of example, and not limitation, computer readable media may comprise computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the computer readable instructions and which can accessed by the electronic devices.

The computer executable instructions may include program modules. Generally, program modules include routines, programs, objects, components, data structures, etc., that perform particular tasks or implement particular abstract data types. Embodiments may also be practiced in distributed computing environments where tasks are performed by remote processing devices that are linked through a communication network. In a distributed computing environment, program modules may be located in both local and remote computer storage media including memory storage devices.

Figure 9:
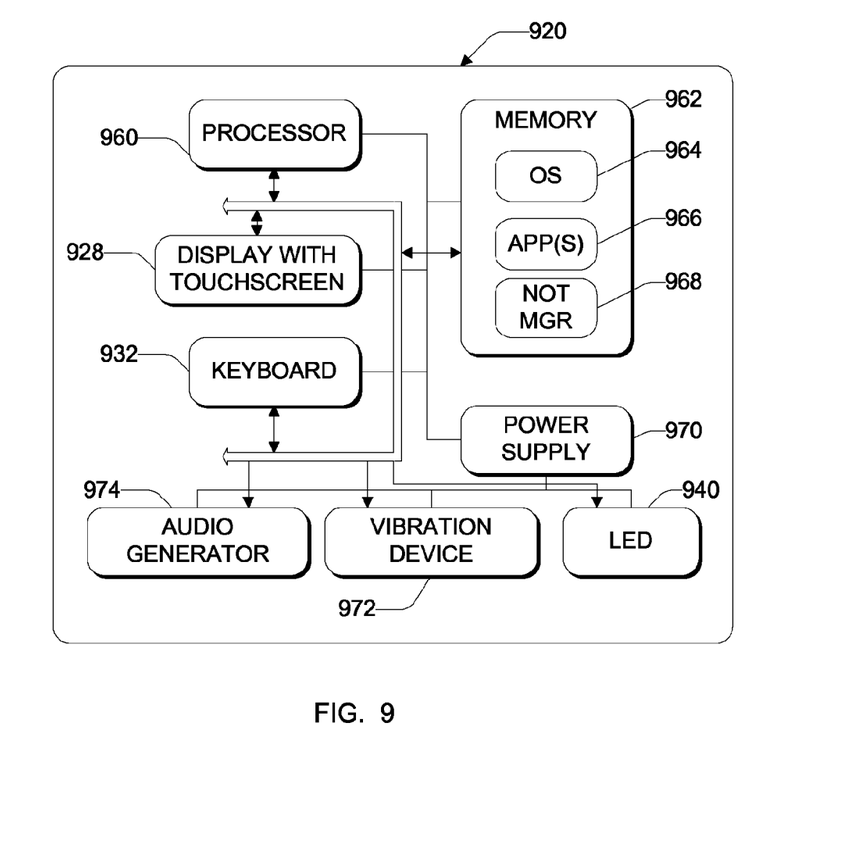
FIG. 9 shows functional components of a handheld computing device that may serve as a platform for some embodiments.

FIG. 9 shows functional components of a handheld computing device 920 that may serve as a platform for some embodiments. For example, computing device 920 may serve as a platform for client 108. It has a processor 960, a memory 962, a display 928, and a keyboard 932. The memory 962 generally includes both volatile memory (e.g., RAM) and non-volatile memory (e.g., ROM, PCMCIA cards, etc.). An operating system 964 is resident in the memory 962 and executes on the processor 960. The H/PC 20 includes an operating system, such as the Windows® CE operating system from Microsoft Corporation or other operating system.

One or more application programs 966 are loaded into memory 962 and executed on the processor 960 by the operating system 964. Examples of applications include email programs, scheduling programs, PIM (personal information management) programs, word processing programs, spreadsheet programs, Internet browser programs, and so forth. In one embodiment, applications 966 include a shared workspace program.

The H/PC 920 also has a notification manager 968 loaded in memory 962, which executes on the processor 960. The notification manager 968 handles notification requests from the applications 966.

The H/PC 20 has a power supply 970, which is implemented as one or more batteries. The power supply 970 might further include an external power source that overrides or recharges the built-in batteries, such as an AC adapter or a powered docking cradle.

The H/PC 920 is also shown with three types of external notification mechanisms: an LED 940, a vibration device 972, and an audio generator 974. These devices are directly coupled to the power supply 970 so that when activated, they remain on for a duration dictated by the notification mechanism even though the H/PC processor and other components might shut down to conserve battery power. The LED 940 preferably remains on indefinitely until the user takes action. The current versions of the vibration device 972 and audio generator 974 use too much power for today's H/PC batteries, and so they are configured to turn off when the rest of the system does or at some finite duration after activation.

Figure 10:
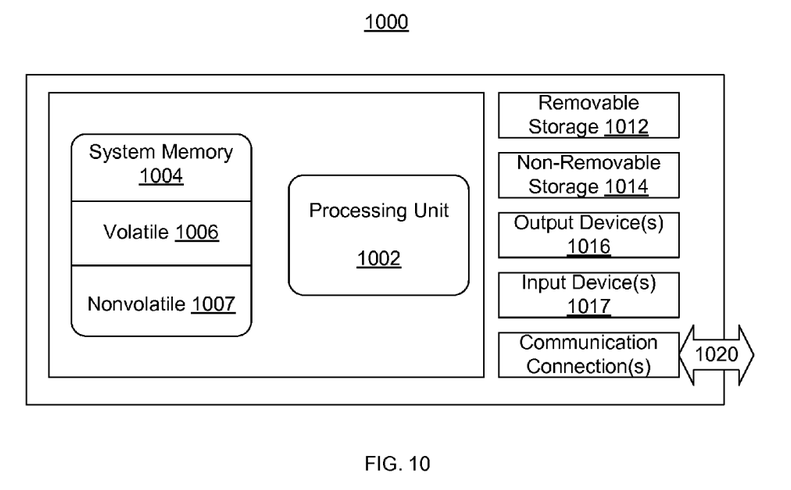
FIG. 10 depicts an example computer system that may serve as a platform for embodiments.

FIG. 10 depicts an example computer system 1000 that may serve as a platform for embodiments. For example, computer system 1000 may serve as a platform for an electronic device such as compute node 202, manager node 102, server 106, or client 108. In its most basic configuration, the computer 1000 typically includes a processing unit 1002 and memory 1004. Pending on the exact configuration and type of computing device, memory 1004 may be volatile 1116 (such as RAM), non-volatile 1007 (such as ROM, flash memory, etc.) or some combination of the two. Additionally, computer 1000 may also have mass storage (removable 1012 and/or non-removable 1014) such as magnetic or optical disks or tape.

Similarly, computer 1000 may also have input devices 1017 and/or output devices 1016. Other aspects of device 1000 may include communication connections 1020 to other devices, computers, networks, servers, etc. using either wired or wireless media. For example, the electronic devices may have a wireless network connection that allows them to access the Internet or another network. The electronic devices may also have communication connections between themselves.

While some embodiments are implemented by executing computer readable instructions that are stored on computer readable media, this is not a requirement in all embodiments. Some embodiments may be implemented in hardware or a combination of hardware and software.

The foregoing detailed description has been presented for purposes of illustration and description. It is not intended to be exhaustive or to limit embodiments to the precise form disclosed. Many modifications and variations are possible in light of the above teaching. The described embodiments were chosen in order to best explain the principles of the disclosure and its practical application to thereby enable others skilled in the art to best utilize various embodiments and with various modifications as are suited to the particular use contemplated. It is intended that the scope of the disclosure be defined by the claims appended hereto.

We claim:

1. A method of distributing content, the method comprising:

instrumenting a Rich Internet Application (RIA) with performance counters that are configured to collect runtime metrics with respect to performance at a client device that executes the RIA;

providing the instrumented RIA to a plurality of client devices;

collecting information at a content distribution network from the plurality of client devices, including collecting runtime metrics that describe execution of the RIA on the client devices, including the content distribution network receiving the runtime metrics from the instrumented RIA on the plurality of client devices, wherein the runtime metrics include one or more of a number of times a function is invoked, average running time of a function, memory utilization, and garbage collection (GC) frequency;

analyzing the runtime metrics to develop a profile of the RIA's behavior and usage at the plurality of client devices;

modifying the RIA based on the profile, the modifying including breaking the RIA into smaller pieces based on what portions of the RIA are needed by a given one of the client devices initially and what portions of the RIA can be transferred later, the modifying is based on the runtime metrics that describe execution of the RIA on the plurality of client devices, the modifying further including:

performing a mash operation at the content distribution network to combine code and/or data from different sources; and performing a security test at the content distribution after performing the mash operation;

providing the portions of the RIA that are initially needed to a first client device of the plurality of client devices including providing the mashed up code and/or data from the different sources to the first client device only if the security test passes;

receiving a request at the content distribution network from the first client device after providing the portions of the RIA to the first client device, the request is for a specified piece of application code within the RIA; and transferring the specified piece of application code of the modified RIA from the content distribution network to the first client device, the transferring includes transferring additional application code to allow the first client device to dynamically update the RIA during execution at the first client device.

2. The method of claim 1, wherein the transferring includes transferring the specified piece of code without transferring an entire file of which the specified piece of code is a part.

3. The method of claim 1, wherein the receiving a request at the content distribution network from first client device includes receiving a request to access at least a portion of a web page that is associated with the RIA.

4. The method of claim 1, further comprising:
receiving the information that was collected at the content distribution network at a manager node;
analyzing the runtime metrics at the manager node; and
transferring results of analyzing the runtime metrics to the content distribution network.

5. The method of claim 4, wherein the modifying the RIA based on the profile includes modifying the RIA based on the information that was transferred to the manager node.

6. The method of claim 1, wherein the analyzing the runtime metrics includes locally analyzing a portion of the information that was collected at the content distribution network, the modifying the RIA is based on the locally analyzing.

7. The method of claim 1, further comprising:
a runtime engine on the first client device determining that it needs the specified piece of code of the RIA or that it will need the specified piece of code in the future, the runtime engine initiates the request from the first client device for the specified piece of code of the RIA.

8. The method of claim 1, wherein the analyzing the runtime metrics to develop a profile of the RIA's behavior and usage at the client devices comprises:
determining tendencies that are specific to a given geographic region.

9. The method of claim 1, further comprising:
individualizing the RIA such that each of the client devices is served a different version of the RIA.

10. A content distribution system comprising:
a manager node; and
a plurality of content distribution networks in communication with the manager node, each content distribution network including one or more compute nodes, wherein the content distribution networks instrument a Rich Internet Application (RIA) with performance counters that are configured to collect runtime metrics with respect to performance at a client device that executes the RIA and provide the instrumented RIA to a plurality of client devices, wherein the content distribution networks collect information from the plurality of client devices, wherein the content distribution networks collect runtime metrics that describe execution of the RIA on the client devices, wherein the content distribution networks receive the runtime metrics from the instrumented RIA on the plurality of client devices, wherein the runtime metrics include one or more of a number of times a function is invoked, average running time of a function, memory utilization, and garbage collection (GC) frequency, wherein the content distribution networks aggregate the information and transfer the aggregated information to the manager node;

wherein the manager node analyzes the information, including analyzing the runtime metrics, from the content distribution networks to develop a profile of behavior and usage of the RIA at the plurality of client devices and transfers the profile to the content distribution networks, the RIA including application code;

wherein a first of the content distribution networks modifies the RIA based on the profile from the manager node including breaking the RIA into smaller pieces based on what portions of the RIA are needed by a given one of the plurality of client devices initially and what portions of the RIA can be transferred later, wherein the modifying is based on the runtime metrics that describe execution of the RIA on the plurality of client devices, wherein as a part of the modifying the RIA the first content distribution network performs a mash operation at the first content distribution network to combine code and/or data from different sources, and the first content distribution network performs a security test after performing the mash operation, wherein the first content distribution network provides portions of the RIA that are initially needed to a first client device of the plurality of client devices, including providing the mashed up code and/or data from the different sources to the first client device only if the security test passes, wherein the first content distribution network receives a request from the first client device for a specified piece of application code within the RIA after providing the portions of the RIA to the first client device, wherein the first content distribution network transfers the specified piece of application code of the modified RIA to the first client device, the specified piece of code including additional application code to allow the first client device to dynamically update the RIA during execution at the first client device.

11. The content distribution system of claim 10, wherein the receiving a request at the first content distribution network from the first client device includes receiving a request to access at least a portion of a web page that is associated with the RIA.

12. The content distribution system of claim 10, wherein the first content distribution network performs a security check on the RIA prior to or while transferring the additional piece of the modified RIA to the first client device.

13. The content distribution system of claim 10, wherein the first content distribution network inserts advertisements into the RIA prior to or while transferring the additional piece of the modified RIA to the first client device.

14. The content distribution system of claim 10, wherein the first content distribution network obfuscates or individualizes the RIA prior to or while transferring the additional piece of the modified RIA to the first client device.

* * * * *